United States Patent
Birk

(10) Patent No.: US 6,318,299 B1
(45) Date of Patent: Nov. 20, 2001

(54) INTERNAL WINGS

(75) Inventor: Uzi Birk, Huddinge (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 09/555,901

(22) PCT Filed: Dec. 1, 1998

(86) PCT No.: PCT/SE98/02196

§ 371 Date: Jun. 5, 2000

§ 102(e) Date: Jun. 5, 2000

(87) PCT Pub. No.: WO99/27772

PCT Pub. Date: Jun. 10, 1999

(30) Foreign Application Priority Data

Dec. 4, 1997 (SE) .................................................. 9704514

(51) Int. Cl.$^7$ .................................................. A01K 29/00
(52) U.S. Cl. .................................................. 119/651
(58) Field of Search ............................ 119/14.01, 14.03, 119/651, 670, 664, 665

(56) References Cited

U.S. PATENT DOCUMENTS

| | | | |
|---|---|---|---|
| 2,952,860 | * | 9/1960 | George . |
| 4,305,346 | * | 12/1981 | Sparr, Sr. ................................. 119/1 |
| 5,211,132 | * | 5/1993 | Farina et al. .......................... 119/158 |
| 5,235,937 | * | 8/1993 | Farina et al. .......................... 119/158 |
| 5,383,423 | * | 1/1995 | van der Lely ......................... 119/158 |
| 5,673,650 | * | 10/1997 | Mottram et al. ...................... 119/651 |
| 6,055,930 | * | 5/2000 | Stein et al. ......................... 119/14.08 |
| 6,155,204 | * | 12/2000 | van der Lely et al. ............. 119/14.02 |

FOREIGN PATENT DOCUMENTS

| | | |
|---|---|---|
| 127 384 | 9/1977 | (DE) . |
| 2 272 626 | 5/1994 | (GB) . |
| 93-187028/23 | 6/1992 | (SU) . |

* cited by examiner

*Primary Examiner*—Peter M. Poon
*Assistant Examiner*—Kevin Jakel
(74) *Attorney, Agent, or Firm*—Young & Thompson

(57) ABSTRACT

The present invention relates to a teat cleaning device having cleaning surfaces (27) on a base (9) wherein the cleaning surfaces (27) can be moved from a first position near to the periphery of said base (9) to a second position nearer to the center of said base (9).

7 Claims, 2 Drawing Sheets

INTERNAL WINGS

The present invention relates to an apparatus according to the preamble of claim 1 for cleaning the teats of animals.

A problem when milking dairy animals is how to ensue that the teats of the animal are clean before milking commences. As manual teat cleaning is labour-intensive, inefficient and time consuming various machines for cleaning teats have been proposed.

The German patent DE 127 384 describes a device with a plurality of elongated brushes mounted vertically on a holder. The brushes are arranged in a circle. The brushes can rotate continuously about their vertical central axis and have horizontally projecting bristles which can brush the surface of any teats introduced vertically down between the brushes in the centre of the circle of brushes. The brush are radially immovable which means that it is not possible to change the size of the hole in the centre of the circle of brushes into which the teat is received. The size of this hole is therefore chosen as a compromise between a size which is too small to receive the largest conceivable teat and too big to adequately clean the smallest conceivable teat. This means that there will always be some teats which are too small or too large to be properly cleaned An object of the present invention is to overcome the problems of the prior art teat cleaning devices. These problems are overcome by a teat cleaning device having the features mentioned in the characterising portion of claim 1.

In the present invention a rotatable teat cleaning means is provided having movable cleaning surfaces which in a rest position lie in positions near to the periphery of the teat cleaning means and which are movable to cleaning positions near to the centre of the teat cleaning means when the teat cleaning means rotates.

Figure 1A:
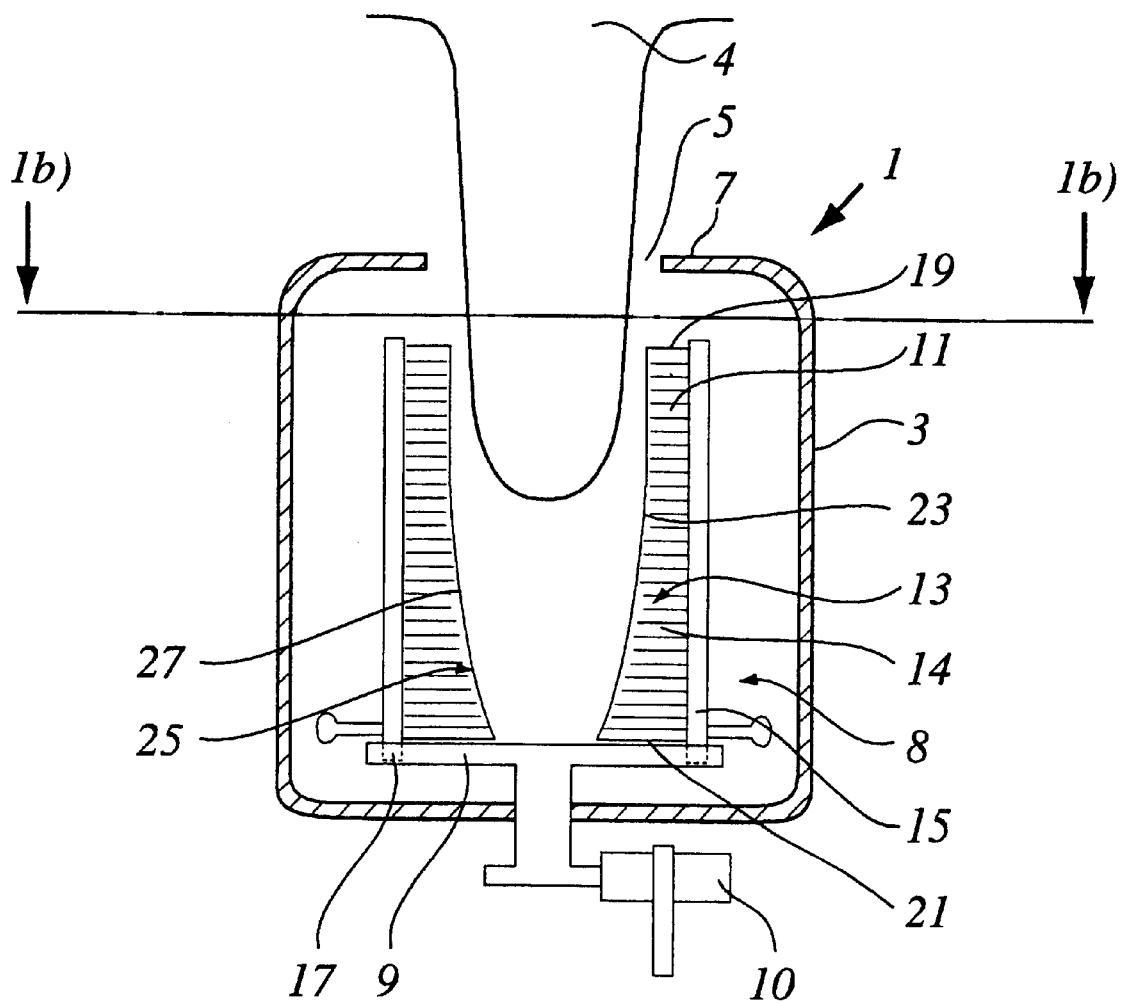
Figure 1B:
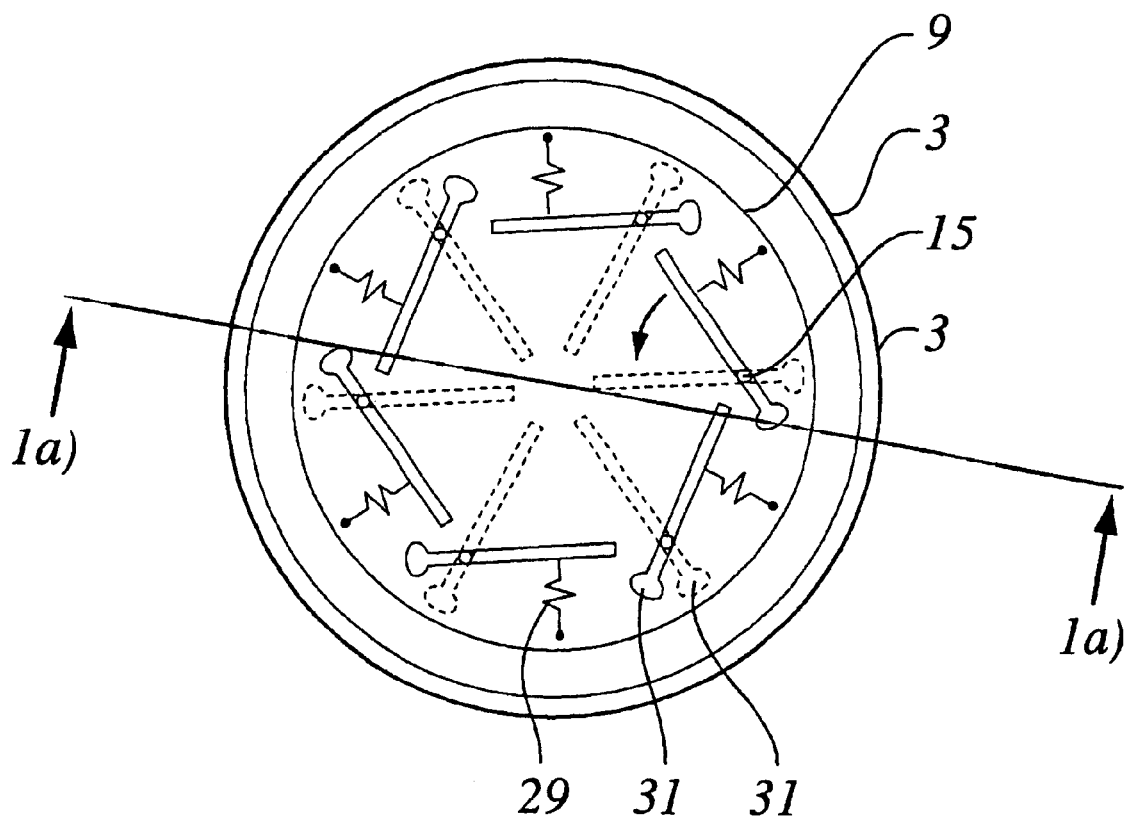

An example of an embodiment of the invention is shown in the appended drawings in which:

FIG. 1a) shows a lateral section along line 1a)—1a) in FIG. 1b) of one embodiment of a teat cleaning device according to the present invention, FIG. 1b) shows a section from above along line 1b)—1b) in FIG. 1a) of the device shown in FIG. 1a).

FIGS. 1a) and 1b) show an example of an embodiment of a teat cleaning device 1 according to the invention. Teat cleaning device 1 comprises a box-like holder 3 with a teat receiving opening 5 in its upper surface 7. Holder 3 is intended to be placed under the udder of an animal to be milked with opening 5 below a teat 4 which is to be cleaned. Holder 3 is then raised so that the teat 4 enters the holder through opening 5. Holder 3 contains teat receiving means 8 having a circular rotatable base in the form of base plate 9 which is driven in rotation by drive means 10. Base plate 9 supports a plurality of cleaning means 11 shown here as elongated wings 11. In this example there are 6 wings 11 equally spaced in a circle concentric with circular base plate 9. Each wing 11 comprises cleaning means 13 in the shape of a flat brush 13 with projecting bristles 14. The wings 11 are provided with cleaning means supporting means 15 in the form of pivotable rods 15 which extend perpendicularly up from base plate 9 and which are rotatable in holes 17 formed in base plate 9. In this instance pivotal rods 15 form the spines of flat brushes 13 and bristles 14 project horizontally from these rods 15. Brushes 13 each have an upper and a lower short side 19, 21 which are substantially parallel and are joined together by first and second long sides 23, 25 attached to the ends of the short sides 19, 21. Upper side 19 is shorter than lower side 21. First long side 23 is preferably perpendicular to upper and lower sides 19, 21 and is attached to supporting means 15. Second long side 25 is inclined and is intended during cleaning to be nearer to the centre of base plate 9 than first long side 23. Second long side 25 forms a teat cleaning surface 27. In the embodiment shown second long side 25 gently curves concavely from upper side 19 to lower side 21 but it could be any desired shape. e.g. straight, complex curved, convex curved, saw-toothed etc.; depending on the type and shape of teat being cleaned. Wings 11 are each orientated with their longitudinal axis substantially perpendicular to the plane of upper surface 7 and are arranged in a circle with a central space 15 able to receive a teat. Each wing 11 is pivotable by means of rods 15 from a first rest and teat receiving position (called rest position from now on for the sake of brevity), shown by solid lines, in which the cleaning surface 27 is near to the circumference of base plate 9, to a second cleaning position (shown by dashed lines) in which the cleaning surface 27 is nearer to the centre of base plate 9.

As is visible in FIG. 1b) each wing 11 is provided with resilient biasing means such as a spring 29 which tends to retain the wings in the first position. Each wing 11 is further provided with position changing means such as a counterweight 31 firmly attached to rod 15 and extending away from the centre of base plate 9. The counterweight is so heavy and so attached to rod 15 that when base plate 9 is rotated to its working speed by drive means 10 the counterweight overcomes the resistance of spring 29 and moves further away from the centre of base plate 9. The causes rod 15 to rotate in hole 17 and cleaning surface 27 to move nearer to the centre of base plate 9.

When holder 3 is positioned around a teat that is to be cleaned the base plate 9 is not rotating and wings 11 are consequently in their first rest positions. This leaves the centre of the base plate 9 under opening 5 free of obstacles and consequently it is easy to insert the teat into the opening. Once the teat is sufficiently received in the holder 3 the base plate driving means 10 are actuated and base plate 9 rotates. This causes the counterweights 31 to move outwards and cleaning surfaces 27 to move in an arc towards the centre of base plate 9. The cleaning surfaces 27 thus move into positions in which they are in contact with the teat and hence able to clean the surface of the teat. They rotate round the teat as base plate 9 rotates and in order to clean the teat they press against the teat with a force which depends on the force developed by the counterweight. This force depends on, amongst others, the weight and position of the counterweight, the rotational speed of the base plate, the width of the teat etc.

Holder 3 preferably further contains cleaning fluid supplying means (not shown) and preferably drying air supplying means (not shown).

While in the above embodiment the cleaning surfaces pivot in an arc around rigid supporting pivots to their cleaning positions it is naturally also possible to mount them on resilient or flexible supports and to provide guide means so that they can travel in a straight line or a line with multiple curves.

It is also conceivable to provide the wings with position changing means which not only move the wings horizontally but also vertically (i.e. in the direction of the longitudinal axis of the wings).

It is conceivable that other cleaning surface position changing means can be used to move the cleaning surfaces from their rest positions to their cleaning positions. For example in a further embodiment of the invention the base plate drive means have a cam means which can move relative to the base plate. The cam means can be so shaped that in the stationary, rest position it allows the cleaning surfaces to take up their rest position while when it is driven it moves the cleaning surfaces into the cleaning position and, simultaneously or subsequently, locks the base plate to the drive means in order to cause the base plate to rotate.

It is also possible that the cleaning surfaces could be mounted on inflatable supporting means which in an un-inflated state retract the cleaning surfaces to their rest positions and when inflated they extend the cleaning surfaces into the cleaning position near to the centre of the base plate or vice versa.

The invention is naturally not limited by the illustrative embodiments mentioned above but can be modified to use any mechanical, electrical, pneumatic, hydraulic or similar means to move the cleaning surfaces to their cleaning positions. Furthermore any suitable material such as foam or solid rubber, sponge, textiles or the like can be used for the cleaning surfaces.

While the invention has been illustrated with examples where rotating cleaning surfaces as used it is also applicable to cleaning means using reciprocating cleaning surfaces.

What is claimed is:

1. Teat cleaning device comprising a teat receiving means (8) having a base (9) wherein said base (9) is rotatable by driving means (10) about an axis of rotation substantially perpendicular to the plane of said base (9), and at least one cleaning surface (27), characterised in that said at least one cleaning surface (27) is movable from a first rest and teat receiving position near to the periphery of said base (9) to a second cleaning position nearer to the centre of said base (9) by the rotation of said base (9).

2. Teat cleaning device according to claim 1, characterised in that said driving means (10) also causes the movement of said cleaning surface (27) from said first position to said second position.

3. Teat cleaning device according to claim 1, characterised in that said cleaning surface (27) is elastically deformable.

4. Teat cleaning device according to claim 1, characterised in that said cleaning surface (27) is pivotable about an axis substantially parallel to the axis of rotation of said base (9).

5. Teat cleaning device according to claim 1, characterised in that said cleaning surface (27) is axially movable.

6. Teat cleaning device according to claim 1, characterised in that it comprises biasing means (29) for biasing said cleaning surface (27) to said first position.

7. Teat cleaning device according to claim 1, characterised in that said cleaning surface (27) is inflatable.

\* \* \* \* \*